R. R. BALL.
Stove-Pipe Damper.

No. 131,591.  Patented Sep. 24, 1872.

Witnesses:
John Becker.
Alex F. Roberts

Inventor:
R. R. Ball
per
Mumm &c.
Attorneys.

UNITED STATES PATENT OFFICE.

ROBERT R. BALL, OF WEST MERIDEN, CONNECTICUT.

IMPROVEMENT IN STOVE-PIPE DAMPERS.

Specification forming part of Letters Patent No. 131,591, dated September 24, 1872.

*To all whom it may concern:*

Be it known that I, ROBERT R. BALL, of West Meriden, in the county of New Haven and State of Connecticut, have invented a new and useful Improvement in Stove-Pipe Dampers, of which the following is a specification:

This invention relates to a new and useful improvement in dampers for stove-pipes and dampers for similar purposes; and consists in the construction of the rod or spindle of the damper and the parts connected therewith, especially in a tapering washer and screw-nut, and in a non-conducting material at the knob end of the spindle, the construction and arrangement of parts being as hereinafter more fully described.

Figure 1:
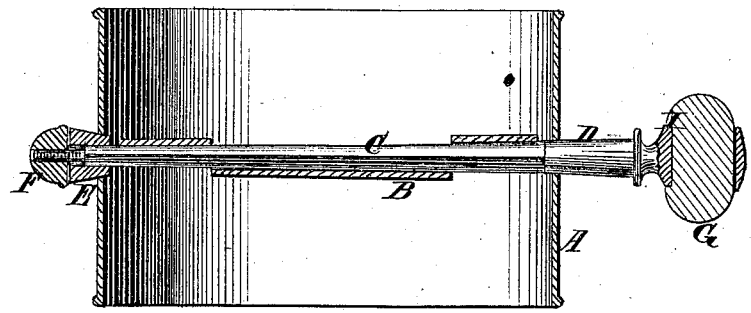
Figure 2:
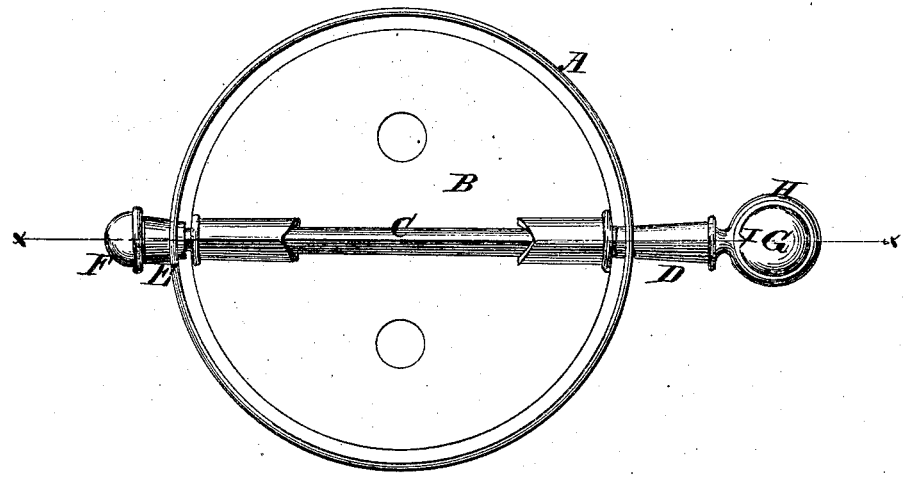

In the accompanying drawing, Figure 1 represents a longitudinal section through the damper taken on the line $x\,x$, Fig. 2; and Fig. 2 is a top view.

Similar letters of reference indicate corresponding parts.

A is the pipe. B is the damper-plate. C is the damper-rod or spindle, which is connected with the plate in the ordinary manner. The knob end of the spindle has a tapering section, D, which enters the hole in the pipe, as seen in the drawing. On the other end of the spindle is a tapering washer, E, which enters the hole on the other side of the pipe, and on the extreme end of the spindle outside of the washer E is a screw-nut, F. It will be seen that by turning up the nut F the spindle will be bound on the tapering section D of the spindle and on the tapering washer E, so that more or less friction may be brought to bear upon it to hold the damper in any desired position. G is a non-conductor of heat in the end of the spindle. I prefer to make it of wood, but it may be made of any other non-conducting material. The spindle is cast with a ring or socket, H, at the handle end, through which the non-conductor is passed. This handle or finger piece may be made of any shape and held in position in any manner. I is a small ledge or rib within the ring H upon which the non-conductor G is driven, and will compress the wood or other material and serve to fasten it. By this arrangement the damper may be adjusted without danger of burning the fingers, and will be held securely in any desired position.

The friction, it will be seen, is entirely on the edge and not on the sides of the pipe. The pipe is not, therefore, compressed between collars, but produces friction where it will be uniform and readily overcome.

The damper-plate and spindle, and the nut and tapering washer are, preferably, made of cast-iron, and require no fitting or labor except the cutting of the screw-thread on the end of the spindle and fitting the nut thereto. The damper is, consequently, very cheaply made, and supplies what the public have long desired to obtain—a stove-pipe damper cheaply made, which will keep its position when adjusted.

I do not claim, broadly, the use of non-heat-conducting handles for any purpose whatever, nor of tightening-nuts in connection with the spindle of damper; but

Having thus described my invention, I claim as new and desire to secure by Letters Patent—

1. The spindle C, provided with the tapered portion D and the squared or polygonal central portion, the tapered washer E, and nut F, all arranged as shown and described.

2. The damper-spindle C, provided with the ring or socket H and the non-conducting plug G fitted therein, as and for the purpose specified.

ROBERT R. BALL.

Witnesses:
ALFRED LURCOTT,
ALEX. F. ROBERTS.